United States Patent

Vita et al.

[11] Patent Number: 5,837,173
[45] Date of Patent: Nov. 17, 1998

[54] PROCESS FOR PREPARING EXPANDED ARTICLES BASED ON CHLOROTRIFLUOROETHYLENE COPOLYMERS

[75] Inventors: Giandomenico Vita, Como; Massimo Pozzoli, Monza, both of Italy

[73] Assignee: Ausimont S.p.A., Milan, Italy

[21] Appl. No.: 791,410

[22] Filed: Jan. 30, 1997

Related U.S. Application Data

[63] Continuation of Ser. No. 547,333, Oct. 24, 1995, abandoned.

[30] Foreign Application Priority Data

Nov. 4, 1994 [IT] Italy .................................. MI94A2237

[51] Int. Cl.$^6$ ..................................................... B29C 44/00
[52] U.S. Cl. .................................... 264/50; 264/DIG. 13; 521/85
[58] Field of Search ............................. 264/50, DIG. 13; 521/85

[56] References Cited

U.S. PATENT DOCUMENTS

| | | | |
|---|---|---|---|
| 3,072,583 | 1/1963 | Randa ........................................ | 521/79 |
| 4,331,619 | 5/1982 | Chung et al. .............................. | 264/13 |
| 4,764,538 | 8/1988 | Buckmaster et al. ...................... | 521/85 |
| 4,877,815 | 10/1989 | Buckmaster et al. ............. | 264/DIG. 13 |
| 5,610,203 | 3/1997 | Buckmaster et al. ...................... | 521/85 |

OTHER PUBLICATIONS

Chemical Abstracts, vol. 100, No. 24, 11 Jun. 1984, abstract No. 193049 and JP–A–59 015 432.

Database WPI, Week 9204, Derwent Publications Ltd., London, GB; AN 92–027223 & JP–A–03 272 516 (Hitachi Cable KK).

European Search Report, Feb. 20, 1996, Application No. EP 95 11 7050.

*Primary Examiner*—Allan R. Kuhns
*Attorney, Agent, or Firm*—Nikaido, Marmelstein Murray & Oram LLP

[57] ABSTRACT

The invention relates to a process for preparing expanded articles based on ethylene-chlorotrifluoroethylene copolymers having high dielectric characteristics consisting in mixing the copolymer with 0.5–2% by weight of boron nitride, extruding the blend at 260°–300° C., injecting into the molten blend nitrogen at 50–150 atmospheres and lowering the pressure for obtaining the expanded article.

5 Claims, 1 Drawing Sheet

PROCESS FOR PREPARING EXPANDED ARTICLES BASED ON CHLOROTRIFLUOROETHYLENE COPOLYMERS

This application is a continuation of application Ser. No. 08/547,333 filed Oct. 24, 1995, now abandoned.

The present invention relates to a process for preparing ethylene-chlorotrifluoroethylene (E-CTFE) copolymers foams having superior dielectric properties.

It is known from U.S. Pat. No. 4,331,619 to prepare E-CTFE copolymers foams by means of a process comprising 1) mixing the copolymer with at least a nucleating agent selected from talc and Mg, Ca, Ba, Zn, Pb carbonates or oxides and with a blowing agent which decomposes by heating yielding gases, preferably of the hydrazocarboxylates class,
2) heating the mixture at temperatures higher than those of the copolymer melting temperature under a sufficient pressure to prevent foaming,
3) lowering the pressure so that foaming occurs.

Such a process, even if it can be used for preparing foamed cables, does not result to be suitable for preparing cables with foamed insulating sheath having a thickness lower than 300 microns, since the presence in the foam of the salts employed as nucleants and of the decomposition residues of the blowing agent, as well as the formation on the foam surface of pinholes, do not allow to obtain high dielectric characteristics necessary for such a use.

It has now been found a process which allows to obtain foamed E-CTFE copolymers having closed cells of average sizes not higher than 40 microns, uniform in size, shape and distribution, having minor impurities substantially not affecting the dissipation degree and the dielectric constant of the foam, which in the electric cables insulation show high dielectric characteristics also for low coating thicknesses comprised between 200 and 300 microns.

Such a process is characterized by the use of boron nitride (BN) as a nucleating agent and of nitrogen as blowing agent injected under pressure into the melted nucleated copolymer.

Object of the present invention is therefore a process for preparing foamed or expanded ethylene-chlorotrifluoroethylene copolymers essentially consisting of mixing the copolymer with 0.5–2% by weight, preferably 0.5–1% by weight, of boron nitride, melting the mixture and extruding it at temperatures from 260° to 300° C., injecting nitrogen into the melted blend under a pressure of 50–150 atm and lowering the pressure so as to obtain the copolymer expansion in the form of foam.

As ethylene-chlorotrifluoroethylene copolymer sold under the brand HALAR$^{(R)}$ is a preferred copolymer produced by AUSIMONT USA having a CTFE content of 40–60% by moles and a M.I. of 0–50, preferably 12–25, determined at 275° C. with a 2.16 kg load according to the ASTM 1238 modified test.

According to a preferred embodiment of the process of the invention, a masterbatch of powdered E-CTFE with 5% by weight of boron nitride (BN) is first prepared by using a double screw extruder to obtain an intimate dispersion of the BN inside the polymeric matrix.

The masterbatch is then mixed with the E-CTFE copolymer so as to obtain a mixture containing 0.5–2% by weight of BN based on the total amount of copolymer.

Such a mixture is then fed in an extruder equipped with an injection system of a gas under pressure, in which the mixture is melted and subsequently injected with nitrogen under pressure, then the pressure is reduced so as to obtain the copolymer expansion.

By the process of the present invention it is possible to prepare cables coated with a layer of expanded E-CTFE copolymers having closed cells with diameters lower than 40 microns also with coating thicknesses lower than 300 microns, with expansion ratios higher than 50%, which are resistant against a 2.5 KV voltage and which maintain good dielectric rigidity characteristics.

The process of the invention is particularly suitable for use in microcables where expanded cables are intended for conveying high frequency signals and in which one wishes to minimize dielectric losses and signal distortions.

The employment of nitrogen which does not leave residues and the use of small amounts of BN assures the good maintenance of bulk properties of the copolymer without worsening of the electric dissipation factor of the insulation due to the presence of salts or other additives, especially if hygroscopic.

EXAMPLE

Figure 1:
FIGS. 1 and 2 show the photos at electron microscope of cross-sections of the coated cable obtained according to the example of the invention. An example follows for illustrative purpose of the invention.
Figure 2:
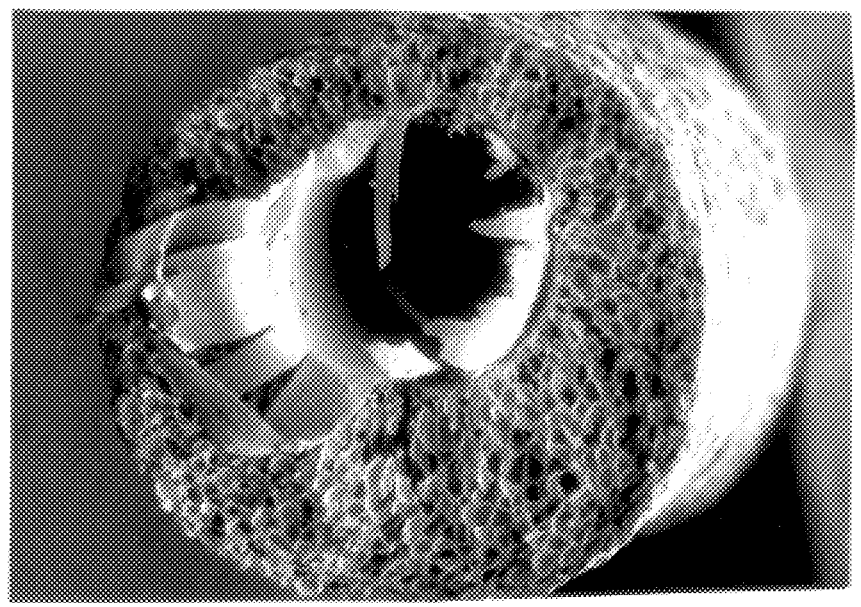

A masterbatch of powdered E-CTFE (M.I. 20 , measured at 275° C. and with a 2.16 kg load) and powdered BN was firstly prepared. BN percentage by weight: 5%. A 28 mm double screw co-rotating extruder Werner & Pfleiderer equipped with a screw profile such as to maximize the BN dispersion inside the polymeric matrix was used. The temperature of the polymer in the molten state was 275° C. The powder mixture fed to the extruder was previously premixed in a Battagion turbomixer.

The product obtained is in form of pellets.

The pellets were then mixed with E-CTFE pellets having a M.I. of 18 , produced by Ausimont USA with the name of HALAR 500. The mixing of master pellets and HALAR 500 has been performed by dry-blending. The mixture was such as to contain on the whole 0.5% by weight of BN.

The utilized extruder is an APV extruder, with a screw divided into 7 zones: transition and melting, compression, I metering, gas injection zones, compression, II metering, mixing.

The final mixing zone is carried out with a pine-apple type element.

The gas utilized was nitrogen, injected through an injector inserted in the cylinder and metered by means of a suitable pressure control system.

Pressures of nitrogen ranging from 50 to 150 Atm, depending on the flow rate of the fed polymers and on the screw revolutions number, were utilized, obtaining similar results. Temperatures utilized in the cylinder (in degrees centigrade): 245, 245, 260, 270, 260.

Temperatures utilized in the head and in the die (in degrees centigrade): 260, 290, 290, 330.

The conductor was appropriately heated with an induction heater before the inlet into the head.

At the die outlet the cable is appropriately cooled with a water bath placed at a distance of about 1.5 cm from the die. The obtained cable, having inner diameter of 0.51 mm and outer diameter of 1.2 mm, with wall thicknesses from 200 to 300 microns, was sectioned in order to obtain photos 1 and 2 by scanning electron microscopy with 68× enlargement.

The closed structure of the cells and their average size not higher than 40 microns are clearly seen therein. In such a way the expanded structure is optimized and a good dielectric rigidity is also obtained: the obtained cable is indeed resistant against 2.5 KV voltage applied by means of a line spark-tester.

The insulating coating density was 0,8 g/cm$^3$, with a degree of voids equal to 52%.

Insulated conductors as the one obtained in the example can be advantageously utilized as structure for coaxial cables or for twisted pairs to be utilized in the field of communications and transmission of high frequency signals.

We claim:

1. A process for preparing expanded articles based on ethylenechlorotrifluoroethylene copolymers having closed cells with an average size not higher than 40 microns consisting essentially of mixing the copolymer with 0.5–2% by weight of boron nitride, melting the mixture and extruding it at 260°–300° C., injecting into the molten blend nitrogen under a pressure of 50–150 Atm., and reducing the pressure so as to obtain the copolymer expansion.

2. Process according to claim 1, wherein the ethylenechlorotrifluoroethylene copolymer has a chlorotrifluoroethylene content of 40–60% by moles and a melt index of 0–50.

3. Process according to claim 2, wherein the melt index of the copolymer is from 12 to 25.

4. Process according to claim 1, wherein the amount of boron nitride in admixture with the copolymer is from 0.5 to 1% by weight.

5. Process according to claim 1 wherein the pressure of the nitrogen injected is from 70 to 120 atmospheres.

* * * * *